United States Patent [19]
Epting

[11] Patent Number: 5,749,682
[45] Date of Patent: May 12, 1998

[54] ARTICLE COLLECTION AND DISTRIBUTION SYSTEM

[75] Inventor: J. Carrol Epting, Pfafftown, N.C.

[73] Assignee: Renfro Corporation, Mount Airy, N.C.

[21] Appl. No.: 707,946

[22] Filed: Sep. 10, 1996

[51] Int. Cl.⁶ .................................................. B65G 51/02
[52] U.S. Cl. ............................ 406/1; 406/169; 406/183
[58] Field of Search .............................. 406/1, 2, 3, 10, 406/12, 19, 26, 27, 28, 29, 31, 117, 120, 128, 130, 133, 155, 156, 168, 169, 171, 183, 192

[56] References Cited

U.S. PATENT DOCUMENTS

| | | | |
|---|---|---|---|
| 3,207,559 | 9/1965 | Poteat et al. | 406/31 |
| 3,207,560 | 9/1965 | Brown | 406/128 X |
| 3,574,409 | 4/1971 | Furstenberg | 406/3 |
| 3,747,986 | 7/1973 | Boon | 406/169 |
| 3,813,127 | 5/1974 | De Feudis | 406/128 X |
| 5,069,583 | 12/1991 | Caldwell | 406/183 X |

*Primary Examiner*—Andrew C. Pike
*Attorney, Agent, or Firm*—Charles Y. Lackey; Kilpatrick Stockton LLP

[57] ABSTRACT

An apparatus for transporting stockings, socks or other sensitively responsive goods by means of air having a principal conduit member and a plurality of selectively closable auxiliary conduit members. The auxiliary conduit members are connected to the output of one or more productions means such as knitting machines. A slidable tubular insert is carried within the principal conduit member and moves from an opened and closed position to open or close an opening in the principal conduit member and permit a formed article to move within. Both the article collecting device and secondary conduit member communicate with the principal conduit member to collect a quantity of articles therein. A work station directing device is formed within the elongated conduit member to collect articles individually and discharge them in groups thereafter. An additional tubular insert member is held within the principal conduit member to open and close the secondary conduit connected directly to a work station.

4 Claims, 4 Drawing Sheets

ARTICLE COLLECTION AND DISTRIBUTION SYSTEM

FIELD OF THE INVENTION

The present invention is directed to a device for selectively collecting a plurality of articles from creating sources, such as knitting machines, transporting those articles to a distant location, and thereafter selectively distributing the articles to predetermined work or collection stations.

BACKGROUND OF THE INVENTION

Pneumatic conveying systems are extensively used in industrial plants to move bulk material from point to point through tubes. Such systems are often used to transport textile goods from one or more textile machines to a series of receptacles at a collecting station and then on to a collection location where the goods can be sorted according to style, color, size, and the like. See, for example, U.S. Pat. No. 3,574,409. Systems of this nature have been used to increase the efficiency and manufacturing product flow within plants for some time.

Thus, a plurality of article forming machines such as hosiery knitting machines can be individually connected to a single flow conduit whereby the output of each machine passes into that conduit and the combined outputs of all connected machines are thus transported to a remote location for subsequent treatment or processing.

While systems like that described above have improved considerably the work in process operations of numerous textile plants including hosiery mills, subsequent operations required to finish hosiery products involve additional work stations where the articles must be sewn to close their toes, labeled, stamped or otherwise processed to incorporate a complete finishing. Plants functioning to accomplish these operations usually have many work stations where sewing machines and operators using the machines receive a plurality of partially finished hosiery garments from a collecting bin and thereafter complete those garments and send them on to a packaging operation. Since withdrawing the hosiery products from the collecting bin and distributing them to each work station is primarily a manual operation, there is a continued need to improve this distribution function so that sewing machine operators automatically receive garments ready for additional work and do not have to wait for a quantity to be delivered manually. It is to this critical need that the present invention is directed.

OBJECTIVES AND SUMMARY OF THE INVENTION

One of the objectives of the invention is to provide an apparatus which can transport the output of one or more producing machines to one or more receiving stations, for example, to work tables or benches in textile manufacturing plants.

Another objective of the invention is to provide a conveying apparatus which can transport sensitive textile goods, particularly stockings, in such a way that the goods are automatically assembled or collected according to size and/ or other characteristics.

A further objective of the present invention is to provide a versatile conveying apparatus which can be rapidly and readily converted for transport of different classes of goods, for transport of goods from a desired number of producing machines to one or more receiving stations, and for manual, semiautomatic, or fully automatic operation.

An additional objective of the invention is to provide a conveying apparatus wherein the goods are treated gently and can be transported at several speeds, along shorter or longer paths and in any desired sequence, or in some cases, simultaneously.

Still another objective of the present invention is to provide a conveying apparatus of the type described which comprises a relatively small number of simple parts and wherein all of the goods, regardless of their origin, can be transported along a single path, even if such goods are ultimately to be classified according to size, shape, color and/or other characteristics.

Yet still a further objective of the present invention is to provide an apparatus of the type described which can be supervised by semiskilled or unskilled personnel, which can be converted for transport of different types of goods to one or more destinations in a single and time-saving manner, and wherein the conversion can be carried out by resorting to mass produced parts.

Yet still another further objective of the present invention is to utilize slidable tubular insert members within primary conduit conveyors to selectively open and close article-receiving openings, to collect a plurality of created articles, and to selectively distribute them to various work stations or other locations thereafter.

Yet still another further objective of the present invention is to provide an apparatus of the type described that utilizes an article collecting device to accumulate a predetermined number of articles and selectively dispatch them to a designated work station.

A principal feature of the present invention resides in the provision of an apparatus for transporting goods, particularly for transporting stockings or socks or other sensitive goods by means of air. In a preferred form, the apparatus comprises elongated conduit means which includes a principal sleeve or conduit member and a plurality of selectively closable auxiliary conduit members, each of which are connected to the output of a creating source such as a circular knitting machine. A slidable tubular circular insert is carried within the principal conduit member and is operably movable to selectively open and close an opening in the principal conduit member and permit a formed article to move therethrough. An article collecting device, together with a secondary conduit member, communicates with the principal conduit member to collect a predetermined number of formed articles therein. Work station directing means are formed within the elongated conduit member to collect articles and systematically discharge them in groups thereafter. Another tubular insert member resides within the principal conduit member to selectively open and close the secondary conduit connected directly to a work station. These and other novel features of the invention are set forth within particularity in the appended claims. The improved collecting and transporting apparatus itself, however, both as to its construction and its mode of operation, together with additional features and advantages thereof, will be best understood from the following detailed description of various embodiments, taken in conjunction with the accompanying drawings wherein like characters of reference designate like parts throughout the several views.

DETAILED DESCRIPTION OF THE PREFERRED EMBODIMENT

Figure 1:
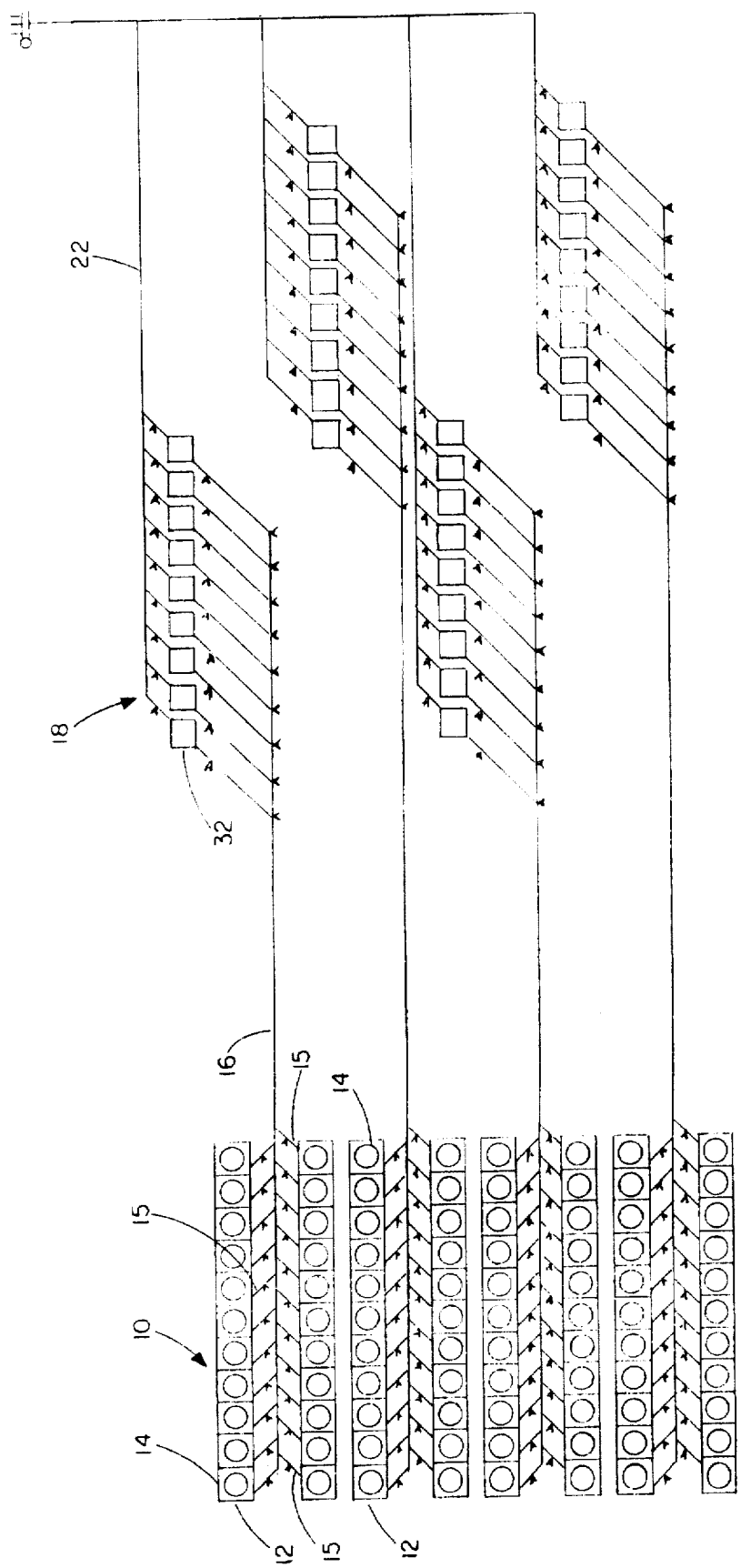
FIG. 1 is a schematic and diagrammatic plan view of the collecting and transporting apparatus of the present invention.

Referring now to the drawings and particularly to FIG. 1 for an example of the present invention, a plurality of garment creating devices such as hosiery knitting machines 10 are grouped in two parallel rows 12 so that the output of each machine 14 extends outwardly from the machine to principal conduit member 16 configured to transport garments created by the machines 14 through auxiliary conduits 15 into conduit 16 to a distant location shown generally as 18. The garments are eventually collected selectively in individual accumulating devices 32 where they are then discharged to a storage receptacle or to individual work stations communing directly with the conduit associated with accumulating means 32. Several lines of machines 10 can be positioned in a manufacturing facility like that shown in FIG. 1 wherein a total of four lines are illustrated.

Figure 8:
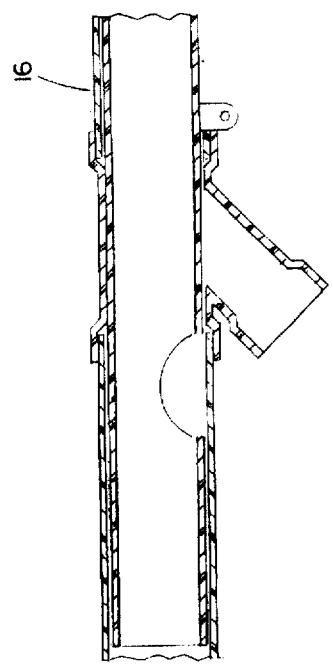
FIG. 8 is the article of FIG. 7 with the opening in the closed position.
Figure 7:
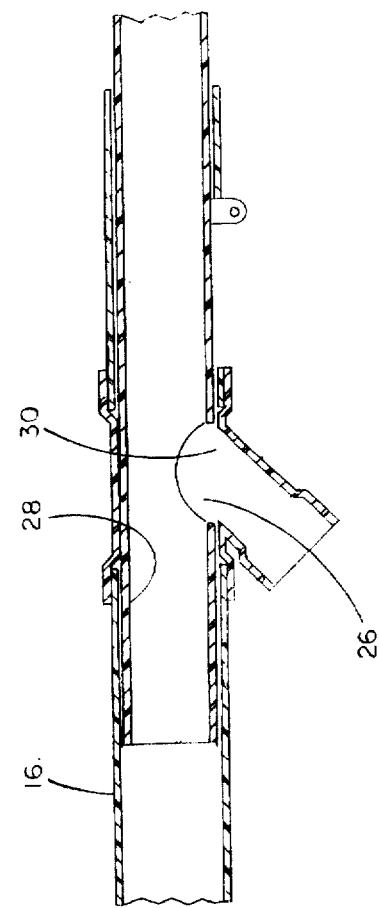
FIG. 7 is an enlarged, sectional and fragmentary view of the gate sleeve members utilized to receive collected articles from the collecting means and direct them to a predetermined location in the open condition.

The specific configuration of principal conduit member 16 receiving garments selectively from knitting machines 14 is shown in FIGS. 7 and 8. FIG. 7 illustrating the principal conduit 16 having an opening 26 in which resides a slidably displaceable sleeve 28 also having an opening 30 which can be selectively positioned to either coincide with opening 26 and provide an entry from the knitting machine into conduit 16 or provide a closed system such as shown in FIG. 8 where the output from the knitting machine cannot enter conduit 16. Suitable switching circuitry associated with the controls of a knitting machine may be employed for the switching operation and is well known to those skilled in the art. A vacuum source is created to provide the pneumatic force to transport formed articles through the various conduits and onto the appropriate work station in a conventional manner. After completion at the workstation, the garment is moved through conduit 22 to a finished station.

Figure 5:
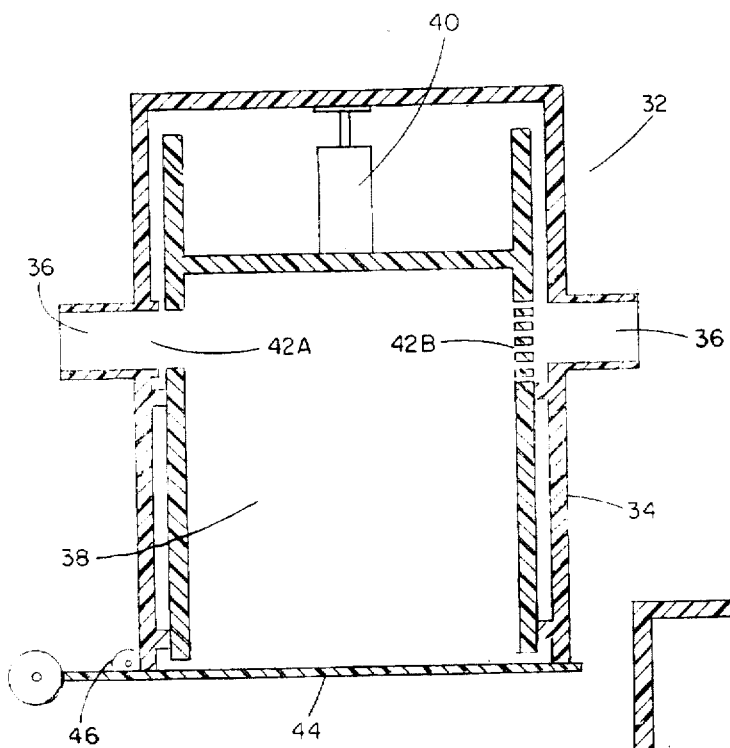
FIG. 5 is the article collecting device wherein the outer chamber openings are in the open condition.
Figure 6:
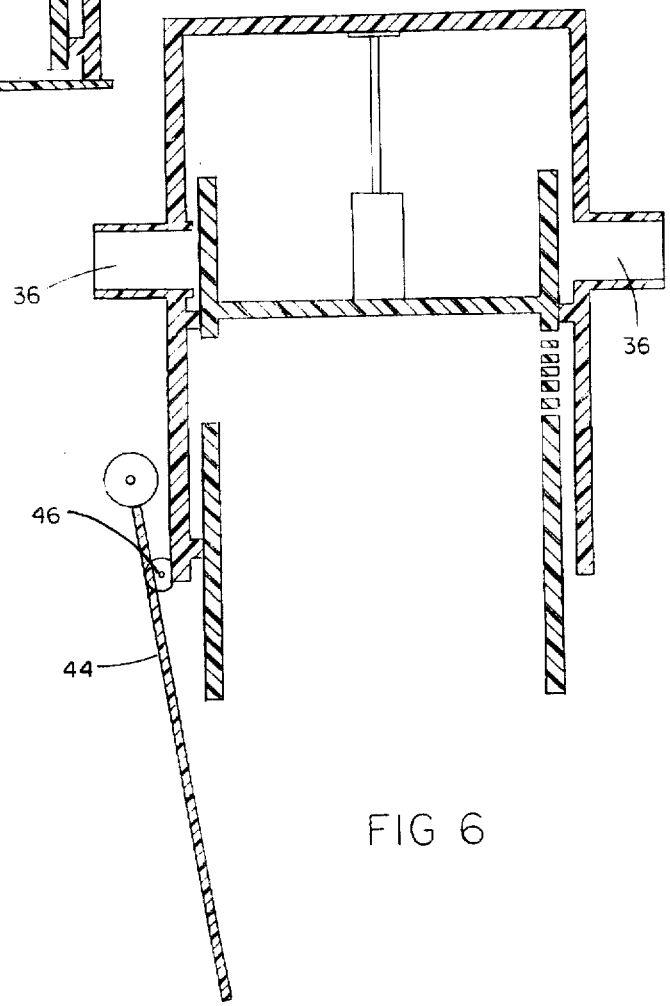
FIG. 6 is the device shown in FIG. 5 wherein the outer chamber openings are closed.

After a garment is discharged from a knitting machine, it is transported through an auxiliary conduit 15 through conduit 16 and eventually into and an accumulating means or a collection receptacle 32 (FIGS. 5 & 6) which receptacle includes an outer chamber 34 with appropriate openings 36 that connect to conduit 16 and an inner chamber 38 that is slidably and vertically movable within receptacle 32 by piston 40 so that apertures 42A and 42B can be positioned to coincide with apertures 36 or to be displaced from them as shown in FIG. 6 so that passage of air and articles through opening 36 is precluded. Aperture 42A is sized as a single opening corresponding to the size of apertures 36. Aperture 42B is comprised of a series of smaller holes that will allow the free flow of vacuum but prevent the passage of the article being transported. A closing lid 44 is pivotally affixed to pivot point 46 and enables interior chamber 38 to be opened so that accumulated articles can be removed therefrom by gravity or other appropriate means.

Figure 2:
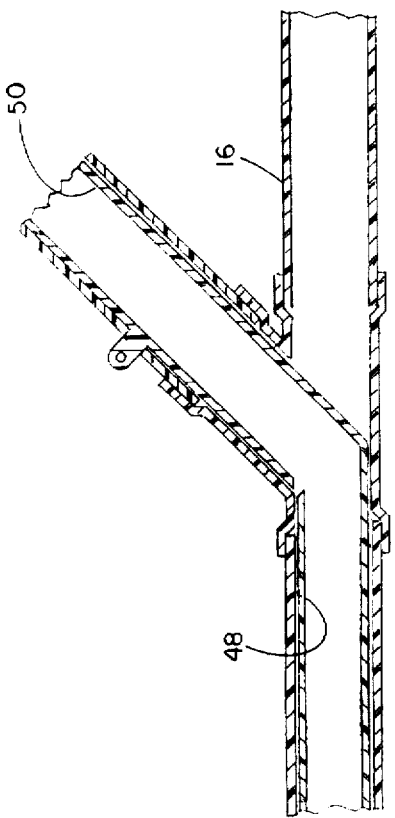
FIG. 2 is an enlarged, sectional and fragmentary view of the elongated sleeve means including a principal conduit member and at least one auxiliary conduit connecting to the article collecting device wherein a slidably movable insert operates to open and close the principal and secondary conduit members and wherein the principal conduit member is in the open condition, the primary function of which is to divert the flow of product.
Figure 3:
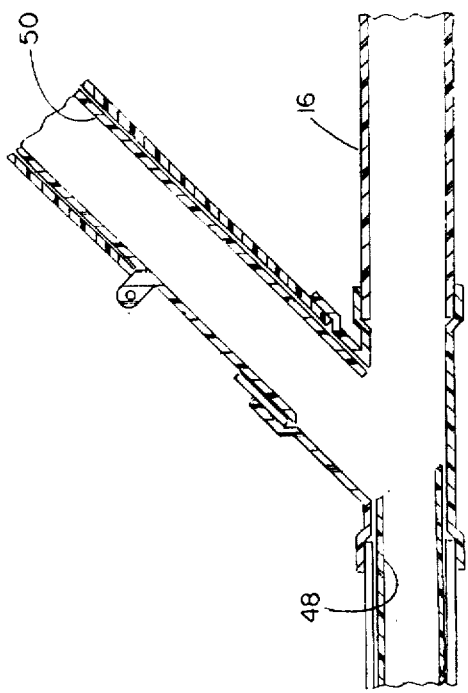
FIG. 3 is the sleeve shown in FIG. 2 wherein the primary conduit member is in the closed condition.
Figure 4:
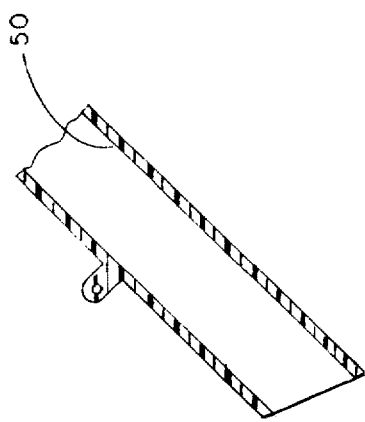
FIG. 4 is an exploded view of the sleeve members forming the gate of the sleeve shown in FIGS. 2 and 3.

Removing formed articles from conduit 16 and into collection receptacle 32 occurs through the gate and liner combination shown in FIGS. 2–4. Conduit 16 houses two slidable inserts 48, 50. The inserts are cut at appropriate angles as shown in FIG. 4 so that inserts 48 and 50 have a 67.5° end cuts. These angles enable the two inserts to join together as shown in FIG. 3 to form a closed conduit 16 so that a garment moving through conduit 16 from knitting machines 14 is deflected angularly toward the collection receptacle 32. When insert 50 is withdrawn to allow conduit 16 to be opened, it is positioned as shown in FIG. 2, thus causing garments or articles to move through conduit 16 without entering insert 50.

While the present invention has been described herein by the embodiments and their applications, it will be understood by those skilled in the art that various changes may be made. These changes and alternatives are considered to be within the spirit and scope of the present invention.

What is claimed is:

1. Apparatus for pneumatically conveying a plurality of articles selectively from at least one of a plurality of sources of the articles to at least one of a plurality of remote locations, the apparatus comprising:

auxiliary conduits each having an inlet and an outlet and connected at the inlet thereof to a respective one of the plurality of the sources of the articles;

secondary conduits each having an inlet and an outlet and connected at the outlet thereof to a respective one of the plurality of the remote locations;

a primary conduit connected to the auxiliary conduits at the outlets thereof and the secondary conduits at the inlets thereof;

a plurality of tubular sleeves slidably carried within the primary conduit each proximate a respective one of the auxiliary conduits and having a wall and a side opening in the wall, wherein each of the tubular sleeves is selectively slidable between a first position wherein the side opening thereof and the inlet of the respective auxiliary conduit coincide with one another to open the outlet of the respective auxiliary conduit for selectively conveying the articles from the respective source of the articles to the primary conduit, and a second position wherein the side opening thereof and the inlet of the respective auxiliary conduit are displaced from one another to close the outlet of the respective auxiliary conduit;

a plurality of tubular liners carried within the primary conduit each having an end cut at an angle proximate the inlet of a respective one of the secondary conduits; and a plurality of tubular inserts each slidable carried within the respective secondary conduit and having an end cut at an angle proximate the primary conduit for selectively joining with the cut end of a respective one of the tubular liners, wherein each of the tubular inserts is selectively slidable between a first position partially inserted into the primary conduit to close the primary conduit wherein the cut ends of the tubular insert thereof and the respective tubular liner are joined together for selectively conveying the articles from the primary conduit to the respective remote location, and a second position withdrawn from the primary conduit to open the primary conduit.

2. The apparatus as claimed in claim 1 further comprising a plurality of collection receptacles for collecting the articles conveyed from the secondary conduits, each of the plurality of collection receptacles having an outer chamber having an inlet connected to the respective secondary conduit for receiving the articles therefrom, and an outlet for discharging the articles; an inner chamber having an inlet for receiving the articles from the outer chamber, and an outlet communicating with the outlet of the outer chamber, wherein the inner chamber is movable between a first position wherein the inlets coincide with one another for collecting the articles within the inner chamber received from the secondary conduit through the inlets, and a second position wherein the inlets are displaced from one another for closing the inlets and discharging the collected articles from the inner chamber; and a lid closing the outlet of the outer chamber when the inner chamber is in the first position thereof.

3. A gate for selectively deflecting articles conveyed in a pneumatic conveyor having a primary conduit and a secondary conduit connected to the primary conduit, the gate comprising:

- a tubular liner carried within the primary conduit and having an end cut at an angle proximate the secondary conduit; and
- a tubular insert slidably carried within the secondary conduit and having an end cut at an angle proximate the primary conduit for selectively joining with the cut end of the tubular liner;

wherein the tubular insert is selectively slidable between a first position partially inserted into the primary conduit to close the primary conduit wherein the cut ends are joined together to selectively deflect the articles from the primary conduit into the secondary conduit, and a second position withdrawn from the primary conduit to open the primary conduit.

4. A collection receptacle for collecting articles conveyed from a pneumatic conveyor having a conduit, the collection receptacle comprising:

- an outer chamber having an inlet connected to the conduit for receiving the articles therefrom, and an outlet for discharging the articles collected from the conveyor;
- an inner chamber having an inlet for receiving the articles from the outer chamber, and an outlet communicating with the outlet of the outer chamber, wherein the inner chamber is movable between a first position wherein the inlets coincide with one another for collecting the articles within the inner chamber received from the conduit through the inlets, and a second position wherein the inlets are displaced from one another for closing the inlets and discharging the collected articles through the outlets; and
- a lid closing the outlet of the outer chamber when the inner chamber is in the first position.

* * * * *